3,177,218
METHYLENE-BIS(2-GUANIDINO-4-METHYL-QUINAZOLINE)

Joseph Patrick Brown, Llangollen, Wales, assignor to Monsanto Chemicals Limited, London, England, a British company
No Drawing. Filed Jan. 17, 1962, Ser. No. 166,906
2 Claims. (Cl. 260—256.4)

This invention relates to quinazolines, and more particularly to di(2-guanidinoquinazolines) and their salts.

In copending application Serial No. 21,124, filed April 11, 1960, and now abandoned, of which this is a continuation-in-part there is described the reaction between dicyandiamide and derivatives thereof whereby the following reaction takes place:

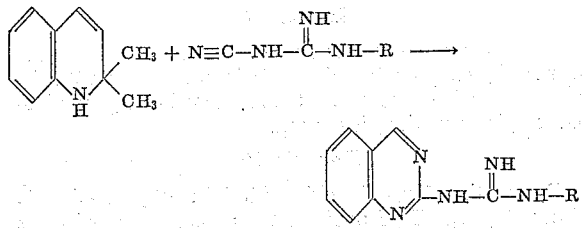

wherein R may be hydrogen or any of a variety of organic radicals.

In accordance with the present invention in part described in the specification, examples and amended claims, bis(dihydroquinolines) will undergo a similar reaction to form compounds of the structure

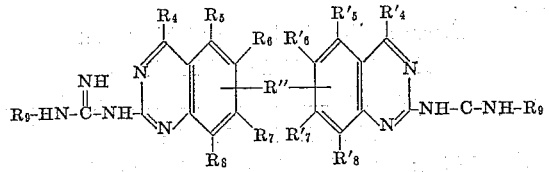

wherein $R_4$ and $R'_4$ are selected from the group consisting of hydrogen and alkyl radicals having up to 12 carbon atoms; wherein $R_5$, $R_6$, $R_7$, $R_8$, $R'_5$, $R'_6$, $R'_7$ and $R'_8$ are selected from the group consisting of hydrogen, nitro, hydroxyl, amino, alkyl radicals of up to 12 carbon atoms, cyclohexyl, benzyl, chlorine, bromine, iodine and the R″ which is selected from the divalent radicals of the group consisting of —O—, —S—, —S—S—, methylene, ethylene, trimethylene, ethylidene, propylidene; and wherein $R_9$ is selected from the group consisting of hydrogen, alkyl radicals having up to 12 carbon atoms, benzyl and phenyl.

A preferred class of the new bis(guanidinoquinazolines) may be represented by the formula:

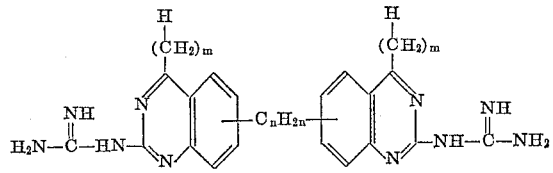

wherein $n$ is an integer from one (1) to three (3) and wherein $m$ is an integer from zero (0) to three (3).

The reactions are conducted by heating the bis(dihydroquinolines) with dicyandiamide or a substituted dicyandiamide having an alkyl radical of up to 12 carbon atoms, or the phenyl or benzyl radical, in the presence of a mineral acid capable of forming an amine salt with the guanidino group. There are however some of the more highly substituted products which do not readily form amine salts. The amine salts can readily be converted to the free amine by neutralization with alkaline metal hydroxides or other relatively strong bases. Conversely the free amines may be in the presence of suitable acid converted to the amine salts if they possess a sufficiently basic amino group to react with the chosen acid.

Bacteriostatic compositions of the invention which are suspensions can if desired be simple ones of the 2-guanidinoquinazoline in an aqueous medium, stabilized if necessary by the presence of a surface-active agent, for instance a soap or a synthetic surface-active agent such as for example the sodium salt of a long-chain alkylated aromatic sulphonic acid. Alternatively, the 2-guanidinoquinazoline can be dissolved in a suitable organic solvent and before use this solution can then be emulsified in an aqueous medium to give an emulsion of the invention; again this can be stabilized if necessary by a suitable surface-active agent. Such an emulsion is often particularly useful. The organic solvent is preferably immiscible with water, and can for instance be a hydrocarbon, such as for instance toluene, cyclohexane or petroleum ether, or some other organic liquid such as chloroform or chlorobenzene. Animal or vegetable oils such as castor oil, olive oil, sperm oil, cottonseed oil or rape oil, or a mineral oil, are also very suitable. Emulsions can be of the "water-in-oil" type, or can be "oil-in-water." In general the suspensions and emulsions can be mobile or viscous, and can for example be in the form of a lotion, paste, cream or ointment.

Compositions which are solids can for instance be those in which the inert diluent is a finely-divided powder such as for instance talc.

The proportions of the bacteriostat employed in the compositions will of course vary according to the nature of the compositions and the intended use. In general it is desirable to incorporate at least 1%, but much larger amounts, for instance 10%, 25% or even 50% can be used, particularly if, as is commonly the case, the composition is a concentrated one intended to be diluted before use.

The compositions of the invention can be employed in any way which makes use of their bacteriostatic properties, for instance in the protection of a variety of materials, including cloth, leather or agricultural products (such as plants, vegetables and fruit) against bacteria and fungi. The invention therefore includes a method for inhibiting the growth of bacteria on a material which normally supports such growth, by treating the material with a 2-guanidinoquinazoline.

Where one of the 2-guanidinoquinazolines is used in soaps, these can be for instance common soap, as well as other soaps derived from natural oils, for example potassium soaps. Waxes in which the 2-guanidinoquinazoline can be used as bacteriostat can be for instance beeswax, carnauba wax and paraffin wax; wax polishes can also be employed. Synthetic plastics which are suitable include both thermoplastic resins, such as vinyl polymers and copolymers (for instance polystyrene, polyvinyl chloride and polyethylene), and thermosetting resins, for example phenol or melamine resins. In general the incorporation of from 0.05% to 5% by weight of the bacteriostat is sufficient.

Specific details of the invention are set forth in the following examples.

Example 1

A concentrated aqueous solution of hydrochloric acid is charged with 5 grams of dicyandiamide and with half of the mole equivalent of 6,6'-methylene-bis(2,2,4-trimethyl-1,2-dihydroquinoline). The solution was boiled under reflux for 40 minutes and the precipitated yellow solid is identified as 6,6'-methylene-bis(2-guanidino-4-methylquinazoline), M.P. 178–180° C.

Example 2

Using the procedure described in Example 1 except that the dihydroquinoline used is 6,6'-ethylidene-bis(2,2,4-trimethyl-1,2-dihydroquinoline). The product resulting from the reaction with the dicyandiamide is identified as 6,6'-ethylidene-bis(2-guanidino-4-methylquinazoline.

Example 3

The procedure of the preceding examples was repeated except that 6,6'-bis(2,2-dimethyl-4-ethyl-1,2-dihydroquinoline)sulfide is reacted in hydrochloric acid with N-phenyldicyandiamide to prepare a compound of the structure:

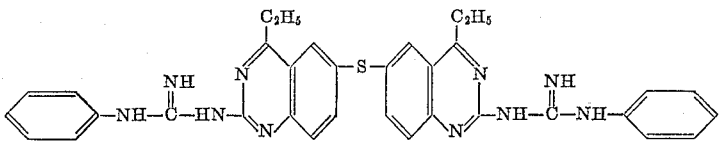

Example 4

By using 8,8' - dithio-bis(2,2,4-trimethyl-1,2-dihydroquinoline) in the reaction with dicyandiamide, 8,8'-dithio-bis(2-quanidino-4-methylquinazoline) is recovered from the reaction mixture.

Example 5

A hydrochloric acid solution in a mixture of water and ethanol is charged with dicyandiamide and a half molar proportion (based on the dicyandiamide) of 6,6'-di(7-chloro - 2,2,5,8 - tetramethyl-1,2-dihydroquinaline). The reactants are heated at reflux for one hour. A compound of the following structure is recovered from the reaction mixture after neutralizing with sodium hydroxide:

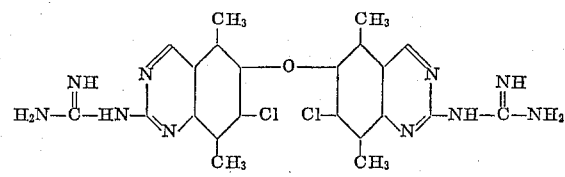

Example 6

Using the procedure of Example 1 except substituting 6,6' - ethylene - bis(2,2,4-trimethyl-1,2-dihydroquinoline) for the 6,6' - methylene-bis(2,2,4-trimethyl-1,2-dihydroquinoline) the product is identified as 6,6'-ethylene-bis(2-guanidino-4-methylquinazoline).

Example 7

By reacting dicyandiamide with 8,8'-propylene-bis(2,2,4-trimethyl-1,2-dihydroquinoline) in accordance with the procedure of Example 1, 8,8'-propylene-bis(2-guanidino-4-methylquinazoline) is formed.

Example 8

By reacting dicyandiamide with 8,8-propylidene-bis(2,2,4-trimethyl-1,2-dihydroquinoline) in accordance with the procedure of Example 1, 8,8-propylidene-bis(2-guanidino-4-methylquinazoline) is formed.

Example 9

By reacting dicyandiamide with 6,6'-propylene-bis(2,2,4-trimethyl-1,2-dihydroquinoline) in accordance with the procedure of Example 1, 6,6'-propylene-bis(2-guanidino-4-methylquinazoline) is formed.

Example 10

By reacting dicyandiamide with 8,8-methylene-bis(2,2,4-trimethyl-1,2-dihydroquinoline) in accordance with the procedure of Example 1, 8,8-methylene-bis(2-guanidino-4-methylquinazoline) is formed.

What is claimed is:
1. 6,6' - methylene - bis(2-guanidino-4-methylquinazoline).
2. 8,8' - methylene - bis(2-guanidino-4-methylquinazoline).

References Cited in the file of this patent
UNITED STATES PATENTS
2,874,182    Surrey _____ Feb. 17, 1959

OTHER REFERENCES

Migridichian: The Chemistry of Organic Cyanogen Compounds (New York, 1947), page 68.
Cavallini et al.: J. Am. Chem. Soc., vol. 81, pages 2564–7 (1959).
Australian Abstract 59,541/60, Oct. 20, 1960.